United States Patent
Li et al.

(10) Patent No.: US 8,207,648 B2
(45) Date of Patent: Jun. 26, 2012

(54) DUAL ROTOR HAVING VARYING AIR GAPS

(75) Inventors: Hu Li, Osaka (JP); Yuichi Yoshikawa, Osaka (JP); Hiroshi Murakami, Osaka (PA)

(73) Assignee: Panasonic Corporation, Osaka (JP)

( * ) Notice: Subject to any disclaimer, the term of this patent is extended or adjusted under 35 U.S.C. 154(b) by 172 days.

(21) Appl. No.: 12/738,770

(22) PCT Filed: Oct. 9, 2009

(86) PCT No.: PCT/JP2009/005265
§ 371 (c)(1),
(2), (4) Date: Apr. 19, 2010

(87) PCT Pub. No.: WO2010/044231
PCT Pub. Date: Apr. 22, 2010

(65) Prior Publication Data
US 2010/0244616 A1    Sep. 30, 2010

(30) Foreign Application Priority Data
Oct. 15, 2008    (JP) .................................. 2008-265993

(51) Int. Cl.
*H02K 1/06*    (2006.01)
*H02K 1/16*    (2006.01)
*H02K 1/26*    (2006.01)

(52) U.S. Cl. ...................... 310/267; 310/266; 310/254.1; 310/216.069; 310/216.071

(58) Field of Classification Search ................ 310/266, 310/267, 254.1, 216.069, 216.07, 216.071; H02K 1/06, 1/16, 1/26
See application file for complete search history.

(56) References Cited

U.S. PATENT DOCUMENTS

| | | | |
|---|---|---|---|
| 5,047,682 A * | 9/1991 | Burgbacher | 310/361 |
| 5,220,228 A | 6/1993 | Sibata | |
| 6,313,558 B1 * | 11/2001 | Abukawa et al. | 310/429 |
| 7,557,486 B2 * | 7/2009 | Choi et al. | 310/266 |
| 2004/0232800 A1 * | 11/2004 | Seguchi et al. | 310/266 |
| 2004/0239199 A1 * | 12/2004 | Qu et al. | 310/114 |
| 2004/0245878 A1 * | 12/2004 | Kim et al. | 310/114 |
| 2007/0205687 A1 * | 9/2007 | Murakami et al. | 310/156.28 |
| 2009/0091204 A1 | 4/2009 | Koshiba et al. | |
| 2009/0134735 A1 * | 5/2009 | Yoshikawa et al. | 310/198 |

FOREIGN PATENT DOCUMENTS

| | | |
|---|---|---|
| JP | 64-085555 A | 3/1989 |
| JP | 03-106869 U | 11/1991 |
| JP | 2000-209829 A | 7/2000 |
| JP | 2004-096874 A | 3/2004 |
| WO | WO 2007/043506 A1 | 4/2007 |
| WO | WO 2007/123057 A1 | 11/2007 |

OTHER PUBLICATIONS

Xia et al., The Series Structure Dual-Rotor PMSM Design, issue date Oct. 2008 (current date Feb. 2009), IEEE Explore.*

* cited by examiner

*Primary Examiner* — Quyen Leung
*Assistant Examiner* — Terrance Kenerly
(74) *Attorney, Agent, or Firm* — Brinks Hofer Gilson & Lione

(57) ABSTRACT

A dual-rotor motor in which inner slot angle φi is larger than outer slot angle φo. An inner notched portion is provided on both circumferential ends of an inner head. This inner notched portion provides a broader space between the inner head and an inner rotor toward both utmost ends of the inner head. An outer notched portion is provided on both circumferential ends of an outer head. This outer notched portion provides a broader space between the outer head and the outer rotor toward both utmost ends of the outer head.

7 Claims, 4 Drawing Sheets

DUAL ROTOR HAVING VARYING AIR GAPS

This application is a U.S. national phase application of PCT/JP2009/005265 filed on Oct. 9, 2009, which claims priority to JP2008-265993 filed on Oct. 15, 2008, the contents of which are incorporated herein by reference.

TECHNICAL FIELD

The present invention relates to dual-rotor motor in which rotors are disposed on both inner and outer circumference sides of a stator, and more particularly to dual-rotor motors suppressing cogging torque.

BACKGROUND ART

A conventional method of suppressing cogging torque in this type of dual-rotor motors is disclosed in a prior art of Patent Literature 1. More specifically, a conventional dual-rotor motor has inner teeth and outer teen on a stator. In general, an inner rotor is provided facing the inner teeth, and an outer rotor is provided facing the outer teeth.

In this structure, the center of inner slot open, the center of outer slot open, and a rotating center are generally aligned in the same straight line. In addition, an inner slot angle and an outer slot angle are often made equivalent. The inner slot open refers to distance between heads of adjacent inner teeth, and the outer slot open refers to distance between heads of adjacent outer teeth. The inner slot angle refers to an angle formed by straight lines connecting the rotating center and both ends of the inner slot open. The outer slot angle refers to an angle formed by straight lines connecting the rotating center and both ends of the outer slot open.

In this structure, cogging torques inside and outside the stator have the same phase. Accordingly, combined cogging torque becomes larger than individual inner and outer cogging torques.

Therefore, for example, Patent Literature 1 proposes a technology of suppressing combined cogging torque by changing inner and outer slot open positions and widths so as to adjust phases and amplitudes of inner and outer cogging torques.

On the other hand, a range of methods of suppressing cogging torque are also proposed for single-rotor motors. One conventional method of suppressing cogging torque is, for example, a prior art disclosed in Patent Literature 2. More specifically, an arc portion is provided at the center and a flat and sloped portion is provided at the left and right of a tip head of teeth provided on the stator. These flat and sloped portions at the left and right are formed such that a gap between a teeth head and the rotor broadens toward both ends. Provision of this flat and sloped portion improves cogging torque by suppressing amplitude of cogging torque.

However, the conventional dual-rotor motor of Patent Literature 1, which sets the position and width of the inner and outer slot open, has a disadvantage in packing factor and work efficiency. If positions and widths of both slot opens are set as in this conventional method, appropriate combined cogging torque is achieved, but the inner and outer slot open positions and widths become uneven. This unevenness reduces the packing factor of windings around the stator, and a complicated shape decreases the work efficiency in the winding operation.

More specifically, if the inner and outer slot opens are provided off the rotating center, the shape becomes complicated for the winding operation. Accordingly, the work efficiency decreases, and an expensive winder for complicated winding process may become necessary. Even if the inner and outer slot open positions are aligned relative to the rotating center, different slot open widths lead to lower winding packing factor because the winding width needs to conform to a narrower slot open width.

If only an amplitude of cogging torque is changed by providing the flat and sloped portion, as in the conventional single-rotor motor of Patent Literature 2, there is a limit to suppression of combined cogging torque in which inner and outer cogging torques are combined in the dual-rotor motor.

Patent Literature 1: U.S. Pat. No. 6,924,574
Patent Literature 2: Japanese Patent Unexamined Publication No. 2000-209829

SUMMARY OF THE INVENTION

A dual-rotor motor of the present invention includes a stator in which a winding is wound around a stator core, an inner rotor disposed at the inner circumference side of the stator, and an outer rotor disposed at the outer circumference side of the stator. The inner rotor and outer rotor are rotatably held facing the stator such that they rotate around a rotary shaft as a rotating center in a circumferential direction.

A stator core includes a ring-like yoke, multiple inner teeth protruding from the yoke on the inner circumference side, and multiple outer teeth protruding from the yoke on the outer circumference side.

The inner teeth includes an inner leg extending from the yoke in the inner circumference side, and an inner head expanding from a tip of the inner leg to both sides in the circumferential direction. An opening is created as an inner slot between adjacent inner teeth. The inner slot includes an inner-slot open that is an opening with an inner slot open width between ends in the circumferential direction of the inner heads of adjacent inner teeth.

The outer teeth includes an outer leg extending from the yoke in the outer circumference side, and an outer head expanding from a tip of the outer leg to both sides in the circumferential direction. An opening is created as an outer slot between adjacent teeth. The outer slot includes an outer-slot open that is an opening with an outer slot open width between ends in the circumferential direction of the outer heads of adjacent outer teeth.

An inner slot angle is an angle formed by straight lines connecting the rotating center and both ends of the inner slot open. An outer slot angel is an angle formed by straight lines connecting the rotating center and both ends of the outer open. The inner slot angle is larger than the outer slot angle.

An inner notched portion is provided on both ends in the circumferential direction of the inner head. This inner notched portion broadens a space between the inner head and the inner rotor toward both utmost ends of the inner head. An outer notched portion is provided on both ends in the circumferential direction of the outer head. The outer notched portion broadens a space between the outer head and the outer rotor toward both utmost ends of the outer head.

By setting the inner slot angle larger than the outer slot angle in this structure, the inner slot open width and the outer slot open width can be made, for example, almost the same. This facilitates aligned winding around the yoke. An inventor also finds that a phase, in addition to amplitude, of cogging torque changes by the shape of aforementioned notched portion. More specifically, by appropriately setting shapes of the inner notched portion and the outer notched portion in the structure that the inner and outer slot open widths are set as above, a phase, in addition to an amplitude, of inner and outer cogging torque can be adjusted. Accordingly, combined cogging torque can also be suppressed by adjusting the shapes of the inner notched portion and the outer notched portion such that the inner cogging torque and the outer cogging torque cancel each other.

DETAILED DESCRIPTION OF PREFERRED EMBODIMENTS

An exemplary embodiment of the present invention is described below with reference to drawings.

Exemplary Embodiment

Figure 1:
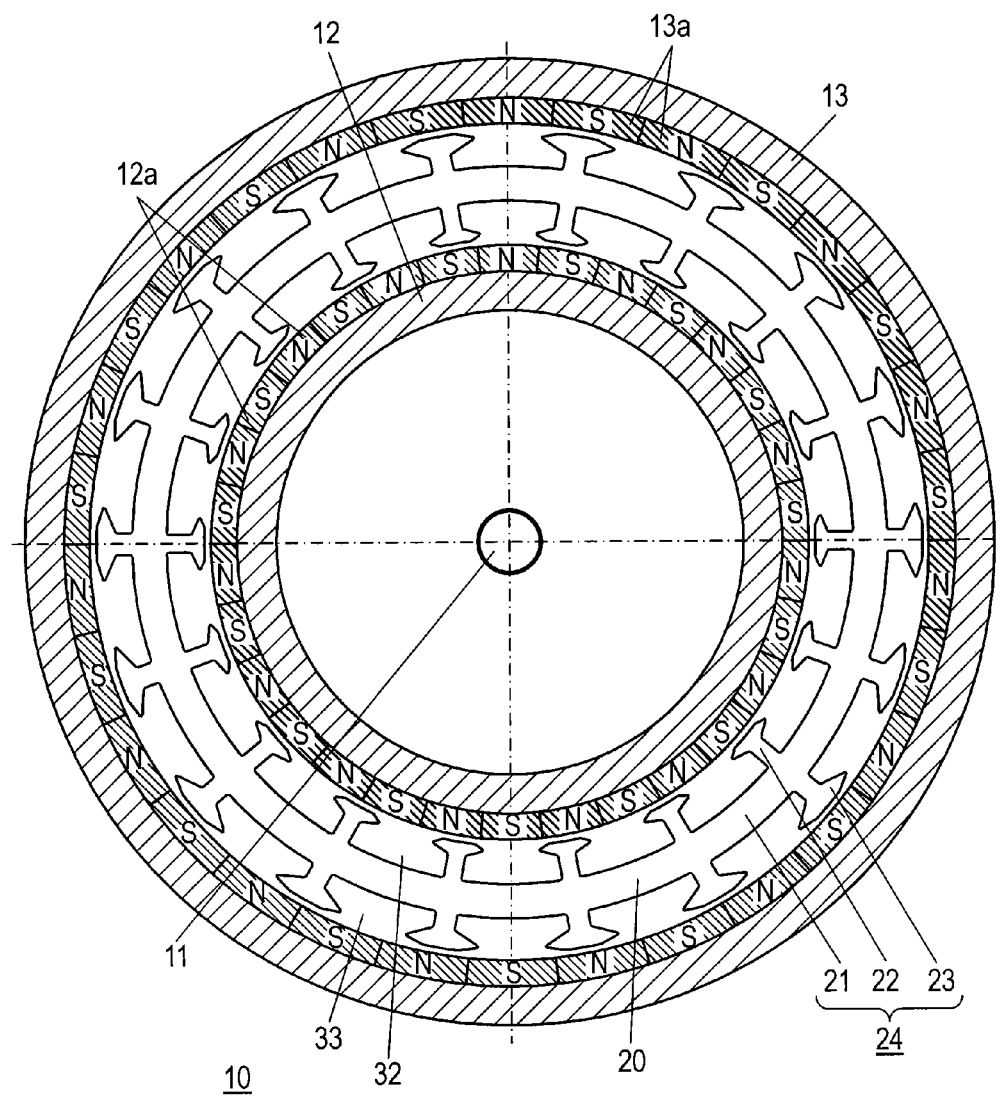
FIG. 1 is a sectional view of a dual-rotor motor in accordance with an exemplary embodiment of the present invention.

FIG. 1 is a sectional view of dual-rotor motor 10 in the exemplary embodiment of the present invention. FIG. 1 illustrates a cross section seen from an extending direction of a rotary shaft. To avoid complication, a winding around a stator is not illustrated.

As shown in FIG. 1, dual-rotor motor 10 in the exemplary embodiment includes stator 20, inner rotor 12 disposed at the inner-circumference side of stator 20, and outer rotor 13 disposed at the outer-circumference side of stator 20.

Stator 20 includes stator core 24 and a winding around stator core 24. Stator core 24 includes ring-like yoke 21, multiple inner teeth 22 protruding from yoke 21 on the inner-circumference side, and multiple outer teeth 23 protruding from yoke 21 on the outer-circumference side. The number of inner teeth 22 and the number of outer teeth 23 are the same in stator core 24 in this exemplary embodiment. In addition, inner teeth 22 and outer teeth 23 are disposed such that a center of inner teeth 22 in the circumferential direction and a center of outer teeth 23 in the circumferential direction are aligned in the same straight line from a rotating center to the outer circumference. Still more, each of inner teeth 22 and each of outer teeth 23 are bilaterally symmetric. Furthermore, an opening called inner slot 32 is formed between adjacent inner teeth 22. An opening called outer slot 33 is formed between adjacent outer teeth 23. Using these openings of stator core 24, each winding is toroidally wound around yoke 21. In other words, windings are wound around yoke 21 between inner slot 22 and outer slot 32 in a concentrated winding form.

Inner rotor 12 retains multiple permanent magnets 12a on its outer circumference such that S pole and N pole are provided alternately. Inner rotor 12 faces inner teeth 22 with a predetermined clearance in between. Outer rotor 13 retains multiple permanent magnets 13a on its inner circumference such that S pole and N pole are provided alternately. Outer rotor 13 faces outer teeth 23 with a predetermined clearance in between. Furthermore, inner rotor 12 and outer rotor 13 are connected to rotary shaft 11, and are rotatably held to rotate around rotary shaft 11 as a rotating center in the circumferential direction, facing stator 20. The rotors may be connected by adhesive or screw, or may also be molded with resin.

In this structure, when AC current is applied to the winding of stator 20, magnetism produces an attractive force and repulsive force between inner teeth 22 and inner rotor 12 and between outer teeth 23 and outer rotor 13. These attractive force and repulsive force make inner rotor 12 and outer rotor 13 rotate around rotary shaft 11. In particular, high torque is gained with a small motor by adopting a dual rotor, as in the exemplary embodiment, in which rotors are disposed on both inside and outside of stator 20.

Next, the structure of stator core 24 in the exemplary embodiment is detailed.

Figure 2:
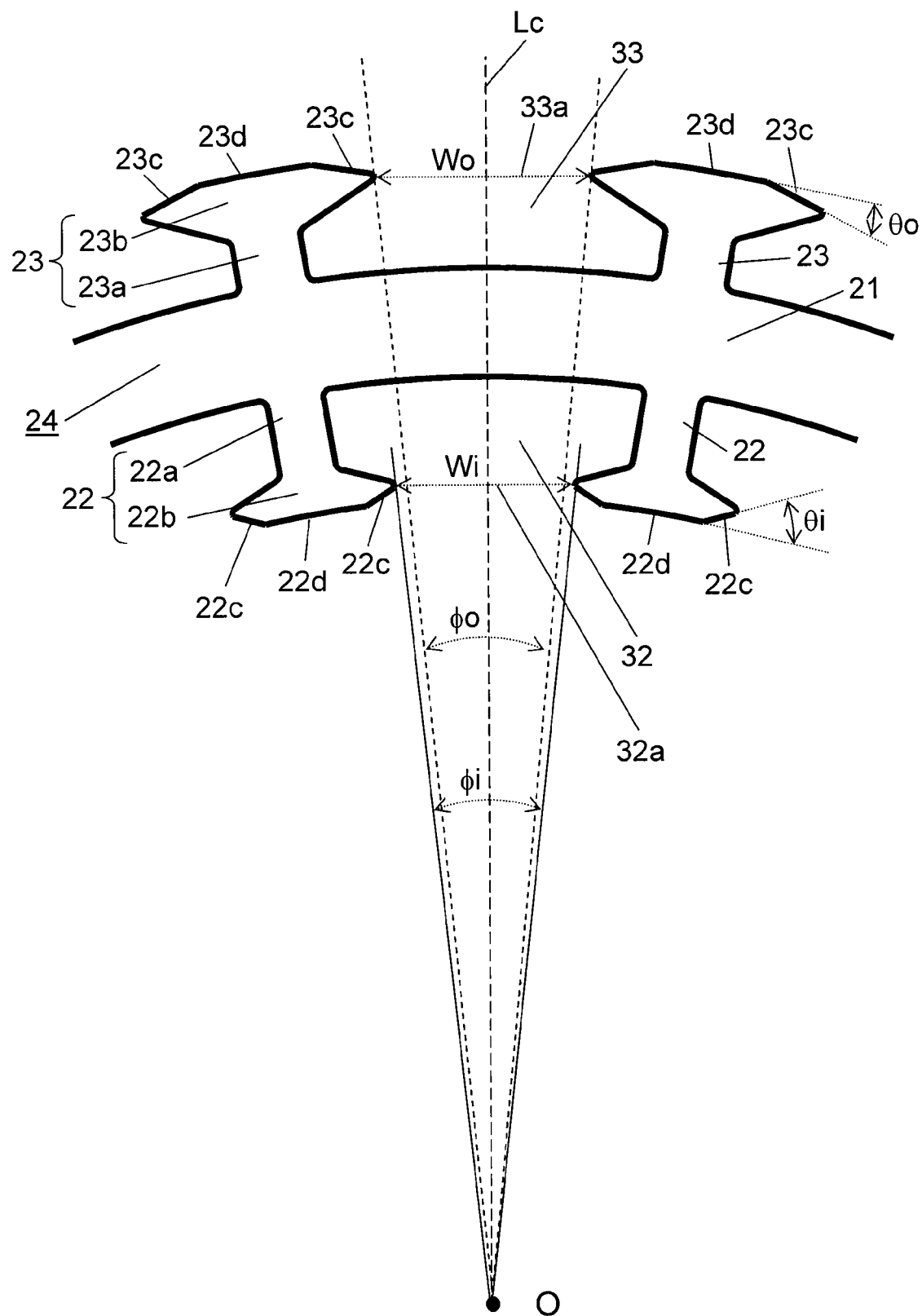
FIG. 2 illustrates a detailed structure of a stator core in the dual-rotor motor.

FIG. 2 illustrates a detailed structure of stator core 24 of dual-rotor motor 10 in the exemplary embodiment of the present invention.

As shown in FIG. 2, inner teeth 22 of stator core 24 has a shape including inner leg 22a and inner head 22b when seen from the extending direction of rotary shaft 11. Inner leg 22a extends from yoke 21 on the inner-circumference side. Inner head 22b expands in both ways in the circumferential direction from a tip of extended inner leg 22a.

As described above, inner slot 32 is formed between adjacent inner teeth 22. Inner slot 32 includes inner slot open 32a that is an opening with inner slot open width Wi between circumferential ends of adjacent inner heads 22b. In other words, inner slot 32 is an opening surrounded by adjacent each inner teeth 22 and yoke 21, and includes inner slot open 32a that is open inward.

On the other hand, outer teeth 23 has a shape including outer leg 23a and outer head 23b when seen from a extending direction of rotary shaft 11. Outer leg 23a extends from yoke 21 on the outer-circumference side. Outer head 23b expands in both ways in the circumferential direction from a tip of extended outer leg 23a.

As described above, outer slot 33 is formed between adjacent outer teeth 23. Outer slot 33 includes outer slot open 33a that is an opening with outer slot open width Wo between circumferential ends of adjacent outer heads 23b. In other words, outer slot 33 is an opening surrounded by adjacent each outer teeth 23 and yoke 21, and includes outer slot open 33a that is open outward.

FIG. 2 shows inner slot angle $\phi i$ and outer slot angle $\phi o$. Inner slot angle $\phi i$ is an angle formed by straight lines connecting rotating center O and both ends of inner slot open 32a. Outer slot angle $\phi o$ is an angle formed by straight lines connecting rotating center O and both ends of outer slot open 33a.

In comparison of inner slot angle $\phi i$ and outer slot angle $\phi o$, inner slot angle $\phi i$ is set larger than outer slot angle $\phi o$ in this exemplary embodiment.

In other words, inner slot open width Wi can be made closer to outer slot open width Wo by setting inner slot angle $\phi i$ larger than outer slot angle $\phi o$. In addition, for example, inner slot open width Wi and outer slot open width Wo can also be made substantially the same width by setting the same width for inner slot open width Wi and outer slot open width Wo. In this way, by making inner slot open width Wi and outer slot open width Wo about the same or equivalent, aligned winding becomes easy. In other words, the same conditions or restrictions are applicable inside and outside for windings wound around yoke 21 through inner slot open 32 and outer slot open 33 if the inner and outer slot open widths are the same. This facilitates aligned winding. In addition, as shown in FIG. 2, aligned winding becomes more efficient by disposing the circumferential center of inner slot open 32a on line Lc connecting the circumferential center of outer slot open 33a and the rotating center O.

Furthermore, stator core 24 in the exemplary embodiment has inner center portion 22d at the circumferential center part of inner head 22b. Inner notched portion 22c is also provided at both circumferential ends of inner head 22b. Stator core 24 also has outer center portion 23d at the circumferential center part of outer head 23b. Outer notched portion 23c is also provided at both circumferential ends of outer head 23b.

Inner notched portion 22c has a shape that a space of clearance between inner head 22b and inner rotor 12 is changing in an inclined manner so that the space is broadened as the inner notched portion 22c comes closer to both utmost ends of the inner head 22b. FIG. 2 shows an example that inner notched portion 22c is provided such that the space between inner head 22b and inner rotor 12 broadens in a predetermined inner spread angle θi from both ends of inner center portion 22d to both utmost ends of inner head 22b. Inner spread angle θi is, as shown in FIG. 2, an angle that the surface of inner notched portion 22c is inclined from a line extended in the circumferential direction from inner center portion 22d.

In the same way, outer notched portion 23c has a shape that a space of clearance between outer head 23b and outer rotor 13 is changing in an inclined manner so that the space is broadened as the outer notched portion 23c comes closer to both utmost ends of the outer head 23b. FIG. 2 shows an example that outer notched portion 23c is provided such that the space between outer head 23b and outer rotor 13 broadens in a predetermined outer spread angle θo from both ends of outer center portion 23d to both utmost ends of outer head 23b. Outer spread angle θo is, as shown in FIG. 2, an angle that the surface of outer notched portion 23c is inclined from a line extended in the circumferential direction from outer center portion 23d.

In the exemplary embodiment, cogging torque in dual-rotor motor 10 is suppressed by providing inner notched portion 22c of this shape to both ends of inner head 22b and outer notched portion 23c also on both ends of outer head 23b. In other words, the inventor finds that a phase, in addition to amplitude of cogging torque, changes by changing the shape of above-described notch.

Figure 3:
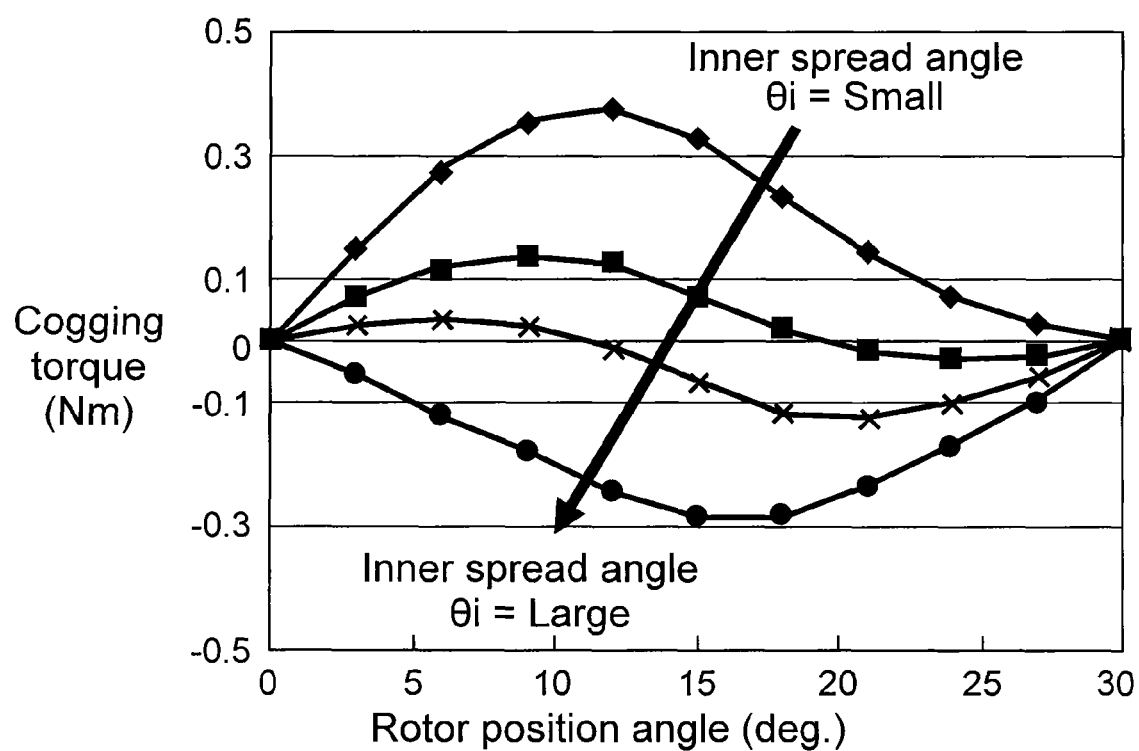
FIG. 3 illustrates a change in cogging torque by changing a spread angle of a notched portion in the dual-rotor motor.

FIG. 3 illustrates changes in cogging torque when a spread angle of the notched portion of the dual-rotor motor is changed in the exemplary embodiment of the present invention. FIG. 3 illustrates characteristic of inner cogging torque at changing inner spread angle θi of inner notched portion 22c. In FIG. 3, the horizontal axis is a rotor position angle, and the vertical axis is cogging torque. Each curve in FIG. 3 shows intensity of cogging torque relative to rotor position angle when inner spread angle θi of inner notched portion 22c is changed.

As show in FIG. 3, amplitude of peak cogging torque changes and peak phase also changes, further inverted, by changing inner spread angle θi. In other words, it is apparent from FIG. 3 that the cogging torque has peak amplitude in the positive direction at the rotor position angle of around 12 degrees when inner spread angle θi is small. The rotor position angle for the peak amplitude shifts as inner spread angle θi becomes broader. As inner spread angle θi is further broadened, the cogging torque reaches its peak amplitude in the negative direction when the rotor position angle is around 15 degrees. In the same way, the peak amplitude or phase of cogging toque changes by changing outer spread angle θo of outer notched portion 23c. The peak amplitude and phase of cogging torque change in the same way also by changing the inclination length of notched portion, in addition to the spread angles of the inner and outer notched portion.

In the exemplary embodiment, inner spread angle θi and outer spread angle θo are set such that combined cogging torque is reduced by using a change in cogging torque in line with a change in the shape of notched portion. The combined cogging torque is generated by combining inner cogging torque caused by the rotation of inner rotor 12 and outer cogging torque caused by the rotation of outer rotor 13.

Figure 4:
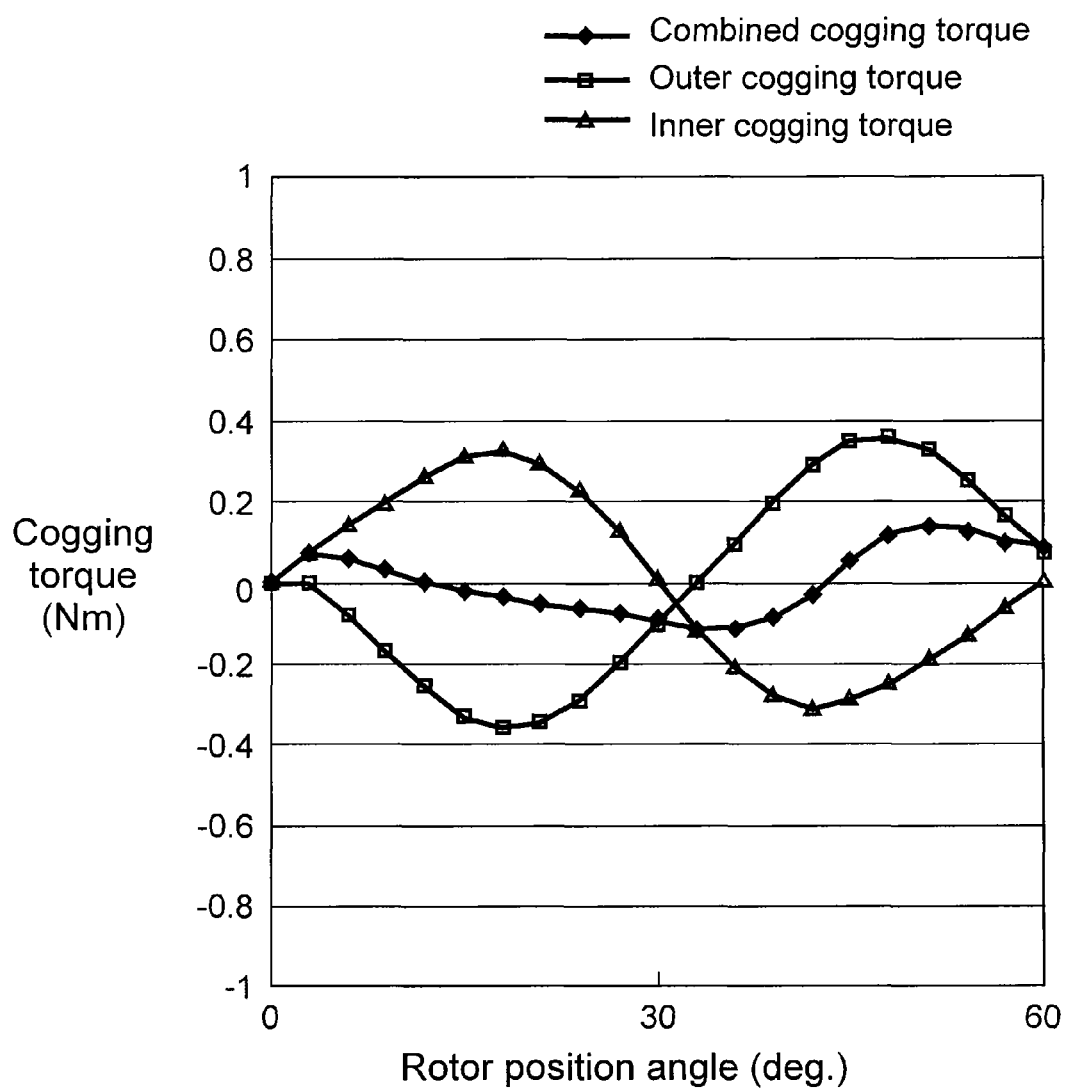
FIG. 4 illustrates each cogging torque of the dual-rotor motor.

FIG. 4 illustrates cogging torques of the dual-rotor motor in the exemplary embodiment of the present invention. In FIG. 4, the horizontal axis is the rotor position angle and the vertical axis is the cogging torque. FIG. 4 illustrates inner cogging torque when inner spread angle θi is set to a predetermined angle, outer cogging torque when outer spread angle θo is set to a predetermined angle, and combined cogging torque combining both cogging torques. As shown in FIG. 4, inner spread angle θi and outer spread angle θo are set such that the phase of inner cogging torque and the phase of outer cogging torque establish an inverted relationship, which means cogging torques have inverted phases. This setting results in cancellation of both cogging torques. As a result, combined cogging torque can be suppressed. Still more, inner spread angle θi and outer spread angle θo are appropriately set such that amplitude of inner cogging torque and the amplitude of outer cogging torque have the same or most approximate values in the inverted phases. This setting enables appropriate cancellation of both cogging torques, and results in significant reduction of combined cogging torque.

As described above, in the dual-rotor motor of the present invention, the inner teeth includes the inner leg and the inner head, and an opening that becomes the inner slot is formed between adjacent inner teeth. The inner slot includes the inner slot open with the inner slot open width between the circumferential ends of adjacent inner heads. The outer teeth includes the outer leg and outer head, and an opening that becomes the outer slot is formed between adjacent outer teeth. The outer slot includes the outer slot open with the outer slot open width between circumferential ends of adjacent outer heads. The inner slot angle corresponding to the inner slot open width is made broader than the outer slot angle corresponding to the outer slot open width. In addition, the inner notched portion is provided on both circumferential of the inner head, and the outer notched portion is provided on both circumferential ends of the outer head.

By setting the inner slot angle larger than the outer slot angle, the inner slot open width and the outer slot open width can be made, for example, almost the same. This facilitates aligned winding around the yoke. Still more, appropriate setting of the shapes of inner notched portion and outer notched portion in this setting for the inner and outer slot open widths enables adjustment of the phase and amplitude of inner and outer cogging torques. This also enables suppression of combined cogging torque.

Accordingly, the present invention offers a dual-rotor motor that facilitates aligned winding so as to increase the winding packing factor, and also allows suppression of cogging torque.

INDUSTRIAL APPLICABILITY

The present invention offers a dual-rotor motor that increases the winding packing factor and also suppresses cogging torque. Accordingly, the present invention is effectively applicable to electric home appliances and electrical equipment that require a small, high-output, highly-efficient, low-noise, and inexpensive dual-rotor motor.

What is claimed is:
1. A dual-rotor motor comprising:
a stator in which a winding is wound around a stator core;
an inner rotor disposed on a radially inner side of the stator; and
an outer rotor disposed a radially outer side of the stator, wherein the inner rotor and the outer rotor are held in a position to face the stator so as to rotate in a circumferential direction around a rotary shaft, the stator core includes a ring-like yoke, a plurality of inner teeth protruding radially inwardly from the yoke, and a plurality of outer teeth protruding radially outwardly from the yoke, the inner teeth including an inner leg extending radially inwardly from the yoke and an inner head extending circumferentially in both ways from a tip of the inner leg, wherein there is formed between a respective pair of adjacent inner teeth an inner slot open having an inner slot open width between opposing circumferential ends of the inner heads of the respective pair of adjacent inner teeth, the outer teeth including an outer leg extending radially outwardly from the yoke and an outer head extending circumferentially in both ways from a tip of the outer leg, wherein there is formed between a respective pair of adjacent outer teeth an outer slot open having an outer slot open width between opposing circumferential ends of the outer heads of the respective pair of adjacent outer teeth, the inner head has an inner surface opposite to the inner rotor, the inner surface comprising a circumferentially extending inner center portion and an inner slope portion extending continuously at an inner spread angle from a respective circumferential end of the inner center portion such that the inner slope portion goes apart progressively from the inner rotor towards its end, and the outer head has an outer surface opposite to the outer rotor, the outer surface comprising a circumferentially extending outer center portion and an outer slope portion extending continuously at an outer spread angle from a respective circumferential end of the outer center portion such that the outer slope portion goes apart progressively from the outer rotor towards its end, and the inner and outer spread angles are respectively set so as to reduce a combination of an inner cogging torque caused by rotation of the inner rotor and an outer cogging torque caused by rotation of the outer rotor.

2. The dual-rotor motor of claim 1, wherein a circumferential center of the respective inner slot open is aligned radially with a circumferential center of an outer slot open.

3. The dual-rotor motor of claim 1, wherein the inner slot open width is substantially equal to the outer slot open width.

4. The dual-rotor motor of claim 1, wherein the inner spread angle and the outer spread angle are set such that the inward cogging torque and the outward cogging torque have phases substantially opposite to each other to cancel each other.

5. The dual-rotor motor of claim 4, wherein the inner spread angle and the outer spread angle are set such that the inner cogging torque and of the outer cogging torque are substantially equal in amplitude in an absolute term over the opposite phases.

6. The dual-rotor motor of claim 1, wherein an inner slot angle is larger than an outer slot angle when the inner slot angle is formed by straight lines connecting the rotating center and both ends of the inner slot open, and the outer slot angle is formed by straight lines connecting the rotating center and both ends of the outer slot open.

7. The dual-rotor of claim 1, wherein the winding is toroidally wound around the yoke through inner slots and outer slots in a concentrated winding form.

* * * * *